(12) United States Patent
Hori et al.

(10) Patent No.: US 7,209,942 B1
(45) Date of Patent: Apr. 24, 2007

(54) INFORMATION PROVIDING METHOD AND APPARATUS, AND INFORMATION RECEPTION APPARATUS

(75) Inventors: Osamu Hori, Yokohama (JP); Miwako Doi, Kawasaki (JP); Kazuo Sumita, Yokohama (JP); Hideki Hirakawa, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 09/472,068

(22) Filed: Dec. 23, 1999

(30) Foreign Application Priority Data

Dec. 28, 1998 (JP) ............................ 10-372746

(51) Int. Cl.
*G06F 15/16* (2006.01)
(52) U.S. Cl. .................. 709/203; 725/46; 725/135; 725/139; 725/141; 725/143; 725/145; 725/146; 725/53; 709/203; 709/217; 709/218; 709/230; 707/1; 707/2; 707/3; 707/10
(58) Field of Classification Search ............... 709/203; 345/704, 723
See application file for complete search history.

(56) References Cited

U.S. PATENT DOCUMENTS

| | | | |
|---|---|---|---|
| 5,907,836 A * | 5/1999 | Sumita et al. ................. 707/2 |
| 5,907,837 A * | 5/1999 | Ferrel et al. ................... 707/3 |
| 6,005,565 A * | 12/1999 | Legall et al. ................ 345/721 |
| 6,018,768 A * | 1/2000 | Ullman et al. .............. 709/218 |
| 6,021,231 A * | 2/2000 | Miyatake et al. ........... 382/305 |
| 6,061,056 A * | 5/2000 | Menard et al. ............. 345/704 |
| 6,108,706 A * | 8/2000 | Birdwell et al. ............ 709/203 |
| 6,236,395 B1 * | 5/2001 | Sezan et al. ................ 715/723 |
| 6,263,501 B1 * | 7/2001 | Schein et al. ................. 725/39 |
| 6,295,092 B1 * | 9/2001 | Hullinger et al. ........... 345/723 |
| 6,363,380 B1 * | 3/2002 | Dimitrova ...................... 707/6 |
| 6,366,296 B1 * | 4/2002 | Boreczky et al. ........... 715/719 |
| 6,415,099 B1 * | 7/2002 | Berger ......................... 386/83 |
| 6,442,538 B1 * | 8/2002 | Nojima ......................... 707/1 |

(Continued)

FOREIGN PATENT DOCUMENTS

DE 44 40 419 5/1996

(Continued)

OTHER PUBLICATIONS

T. Hashimoto, et al., Information Processing Society of Japan Research Report (98-DBS-116), vol. 98, No. 58, pp. 1-8, "A Study of Restructured Data Retrieval for Selective Viewing of Contents", Jul. 10, 1998 (with English Abstract).

(Continued)

*Primary Examiner*—Syed A. Zia
(74) *Attorney, Agent, or Firm*—Oblon, Spivak, McClelland, Maier & Neustadt, P.C.

(57) ABSTRACT

By moving image analysis, acoustic/speech analysis, or text analysis for multimedia information in a database, feature data representing the type of information is acquired, and the feature data is stored into the database added to the multimedia information. A search engine extracts partial images of user's interest from the multimedia information on the basis of the feature data and a user profile data. A link section associates the representative images (still images) of the partial images with multimedia images and displays the list of representative images and feature data. Thus, only a portion of the user's concern is extracted from an enormous amount of multimedia information, and individual information is selectively provided in units of users.

25 Claims, 17 Drawing Sheets

U.S. PATENT DOCUMENTS

| | | | |
|---|---|---|---|
| 6,546,399 B1 * | 4/2003 | Reed et al. | 707/104.1 |
| 6,564,263 B1 * | 5/2003 | Bergman et al. | 709/231 |
| 6,571,054 B1 * | 5/2003 | Tonomura et al. | 386/95 |
| 6,748,375 B1 * | 6/2004 | Wong et al. | 707/3 |

FOREIGN PATENT DOCUMENTS

| | | |
|---|---|---|
| JP | 9-245049 | 9/1997 |
| JP | 10-301946 | 11/1998 |
| WO | WO 90/11587 | 10/1990 |
| WO | WO 98/19450 | 5/1998 |

OTHER PUBLICATIONS

J. Kuboki, et al., ITEJ Technical Report (BCS' 99-11), vol. 23, No. 28, pp. 1-6, "Method of Making Metadata for TV Production Using General Event List (GEL)", Mar. 24, 1999 (with English Abstract).

T. Taima, et al., Technical Report of IEICE (IE95-149), The Institute of Electronics, Information and Communication Engineers, vol. 95, No. 584, pp. 9-14, "An Automatic Structuring Method for Video Programs", Mar. 15, 1996 (with English Abstract).

Agent TV, Technical Research Report From the Institute of Electronics, Information and Communication Engineers (AI98-54), Dec. 1, 1998, vol. 98, No. 437, pp. 1-8.

* cited by examiner

| TASTE INFORMATION ASSOCIATED WITH TYPE OF PROGRAM |
|---|
| 1) SUSPENSE |
| 2) DRAMA |
| 3) DOCUMENTARY |
| 4) SPORTS |
| 5) VARIETY |
| 6) NEWS |
| ⋮ |

FIG. 2A

| TASTE INFORMATION ASSOCIATED WITH CONTENTS OF PROGRAM |
|---|
| MOVIE (3) |
| 1) ACTION SCENE |
| 2) LOVE SCENE |
| 3) CLIMAX SCENE |
| NEWS (4) |
| 1) POLITICS |
| 2) ECONOMY |
| 3) SPORTS |
| 4) CITY NEWS |
| ⋮ |

FIG. 2B

| TASTE INFORMATION ASSOCIATED WITH PRODUCTION OF PROGRAM |
|---|
| FILM DIRECTOR (2) |
| 1) ICHIRO TOSHIBA |
| 2) JIRO TOSHIBA |
| ACTOR (2) |
| 1) SABURO TOSHIBA |
| 2) SHIRO TOSHIBA |
| ACTRESS (1) |
| HANAKO TOSHIBA |
| COMPOSER (1) |
| GORO TOSHIBA |
| ⋮ |

FIG. 2C

| PERSONAL PROFILE |
|---|
| 1) SEX: MALE |
| 2) AGE: 38 YEARS |
| 3) UNMARRIED |
| 4) HEIGHT: 170 CM |
| 5) HOME TOWN: NARA PREFECTURE |
| 6) BIRTHDAY: FEBRUARY 2, 1961 |
| ⋮ |

FIG. 2D

| KEYWORD REPRESENTING TASTE |
|---|
| 1) FAVORITE FOOD: APPLE |
| 2) FAVORITE SPORT: SOCCER |
| 3) FAVORITE PROVERB: TIME IS MONEY |
| ⋮ |

FIG. 2E

| NEWS | TIME | KEYWORD |
|---|---|---|
| | 0:00 – 0:05 | POLITICS |
| | 0:15 – 0:16 | ECONOMY |
| | 0:23 – 0:25 | WEATHER FORECAST |

FIG. 4

| USER PROFILE KEYWORD | TIME | THESAURUS KEYWORD |
|---|---|---|
| SHOPPING | 0:00 – 0:05 | DEPARTMENT STORE |
| SHOPPING | 0:20 – 0:23 | BAKERY |
| SHOPPING | 0:27 – 0:29 | SUPERMARKET |
| SHOPPING | 0:10 – 0:20 | BOOKSTORE |

| | | | | | | | |
|---|---|---|---|---|---|---|---|
| SHOPPING | DEPARTMENT STORE | BAKERY | SUPERMARKET | BOOKSTORE | | | TOWN (P) |
| | | JUNIOR HIGH SCHOOL (P) | JUNIOR SCHOOL | BOOK CD VI | CM | | |
| PUBLIC FACILITY | | | | SHOPPING | PARK (P) | | LIBRARY |
| | CM | BUS STOP | | CM | | | |
| TRANSPORTATION/ BANK | STATION | | | BANK | | CM | |
| | | | CM | BANK | CM | | CM |
| HEALTH/HOSPITAL | HOSPITAL | DENTIST | CM | FITNESS | GOLF | | CM |
| | | | | | | | |

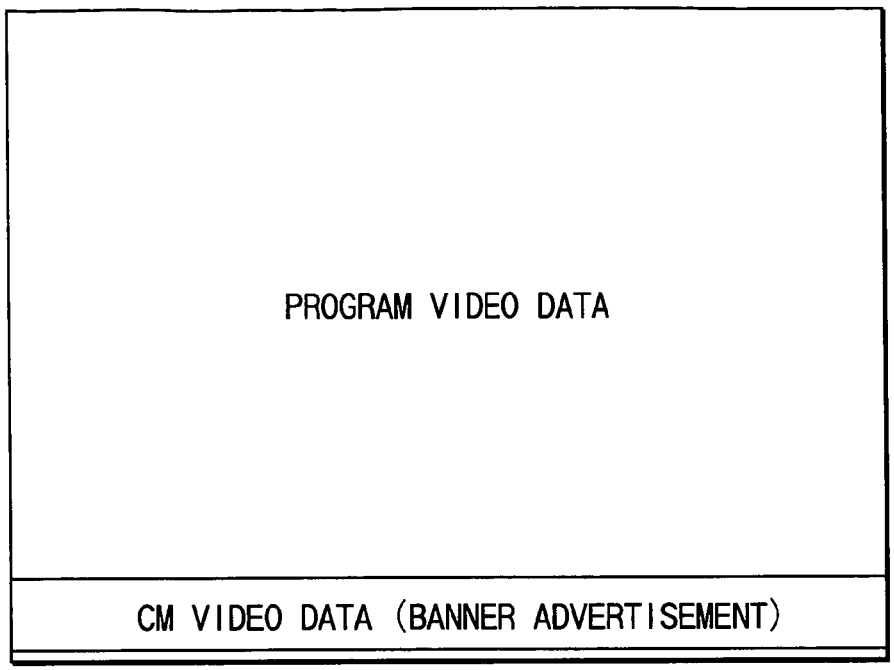
F I G. 9
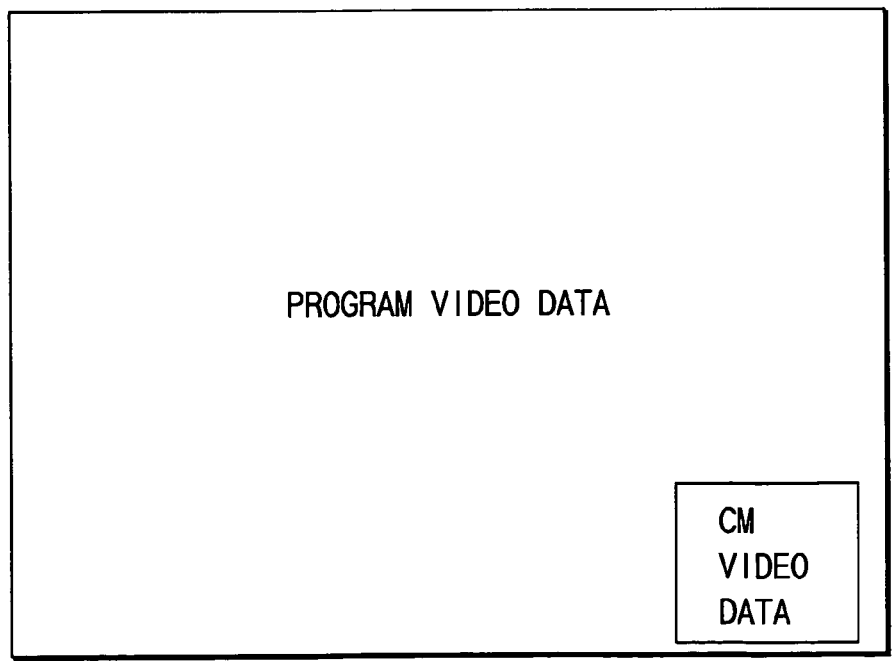
F I G. 10

INFORMATION PROVIDING METHOD AND APPARATUS, AND INFORMATION RECEPTION APPARATUS

BACKGROUND OF THE INVENTION

The present invention relates to a multimedia information providing method and apparatus for providing video, music, and text data to many and unspecified users through the Internet, etc., and a multimedia information reception apparatus for receiving the video, music, and text data. More particularly, the present invention relates to a multimedia information providing method and apparatus and a multimedia information reception apparatus for selecting only information of user's interest from a number of multimedia information and providing individual information to the user.

This application is based on Japanese Patent Application No. 10-372746, filed Dec. 28, 1998, the entire content of which is incorporated herein by reference.

In recent years, growth of information infrastructures is boosting opportunities for distributing home many multimedia information through CATV (cable television broadcasting), digital satellite broadcasting, or the Internet. A variety of programs are provided, and the number of service channels has reached an order of several hundred or several thousand. Therefore, it is becoming difficult for a user to appropriately select information from the several hundred or several thousand channels or tens of thousands or more programs in the channels.

To solve this problem, a receiver device for automatically recording programs of user's interest using the information of an electronic program list sent from a broadcasting station has been proposed (e.g., "video device" disclosed in Jpn. Pat. Appln. KOKAI Publication No. 7-135621).

This proposed device selects programs that may be of interest for a user from the information of an electronic program list on the basis of keywords registered in advance and automatically filters programs in units of users.

To prepare an attractive program providing program, a program provider wants to know the types of programs viewed by viewers. Conventionally, a provider raises monitors, lets them fill out a questionnaire, and gathers the results to know programs watched by the monitors. However, with the questionnaire of fill-out type, only rough information representing whether or not a viewer has watched a certain program can be obtained.

In a conventional system for automatically selecting a program from an enormous number of programs provided by a program provider in accordance with a personal taste, selection is just roughly done in units of programs. Consider a program such as a news show or a variety show. In such programs, one program is constructed by units of "topics" or "corners". Quite often, user's interest is only in some of images in one program. However, in automatic recording in units of programs, one program is entirely selected and recorded from the beginning to the last. The user cannot know the position of information of his/her actual interest unless he/she watches the entire program. Hence, even when a program is selected and recorded by filtering, the user must watch the recorded program from the beginning to the last, wasting the recording medium and user's time.

Filtering may omit CMs contained in a program. When a broadcasted program is not a pay TV program but a free program for which the ad rate is the source of revenue, whether the viewers actually watch CMs or not is an important factor for the program provider in soliciting advertisement. Hence, to exclude CMs from the program content poses a serious problem.

In addition, conventional audience rating survey is done in units of programs and is therefore insufficient to precisely grasp the users' tastes and the like.

BRIEF SUMMARY OF THE INVENTION

Accordingly, it is an object of the present invention to provide the following information providing method and apparatus, information reception apparatus, and data structure.

It is the first object of the present invention to provide an information providing method and apparatus and an information reception apparatus capable of appropriately selecting and providing portions of user's actual interest from a number of multimedia information instead of filtering in units of programs.

It is the second object of the present invention to provide an information providing method and apparatus and an information reception apparatus capable of appropriately selecting and providing portions of user's actual interest from a number of multimedia information instead of filtering in units of programs, in which a commercial message that the program provider wants a viewer to watch is surely provided.

It is the third object of the present invention to provide an information providing method and apparatus and an information reception apparatus capable of appropriately selecting and providing portions of user's actual interest from a number of multimedia information instead of filtering in units of programs, in which user's viewing history is recorded, and a user profile representing user's taste can be updated in accordance with the viewing history.

It is the fourth object of the present invention to provide a data structure of describing the above user profile used in the information providing apparatus and the information reception apparatus.

According to the present invention, there is provided an information providing method comprising:

adding program feature data to multimedia information in units of parts of the multimedia information to form a program database;

searching for partial information which accords with user profile data from the multimedia information based on matching between the user profile data and the program feature data; and providing the searched partial information to a user.

According to the present invention, there is provided an information providing apparatus comprising:

a first database configured to store multimedia information;

an analyze section configured to analyze the multimedia information stored in the first database using at least one analysis method of moving image analysis, acoustic/speech analysis, and text analysis;

a second database configured to store program feature data which is obtained in units of parts of the multimedia information or externally inputted; and a search engine configured to search for program feature data from the second database in accordance with user profile data, and select partial information from the multimedia information stored in the first database in accordance with searched program feature data.

According to the present invention, there is provided an information reception apparatus connected to an information providing server having a database which stores multimedia information and program feature data which is an analysis result of at least one of moving image analysis, acoustic/speech analysis, and text analysis or externally inputted, comprising:

a search engine configured to search for predetermined program feature data from the database and select partial information from the multimedia information stored in the database in accordance with searched program feature data.

According to the present invention, there is provided an information describing method comprising:

classifying information items into plural groups of information items relating to personal information of a user, some of the groups of information items including plural subgroups; and describing each information items in the group or the subgroup in an order according to a priority of the information item which is determined for each user.

According to the present invention, corresponding partial information can be selected on the basis of a user profile data.

It is possible to select such a commercial message in accordance with the user profile data a commercial message that a program provider wants a viewer to watch if the commercial message is also stored in the database as in the same manner as the multimedia information.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 2A to 2E are views showing the data structure of a user profile;

FIG. 4 is a view showing an example of an extracted program feature;

FIG. 6 is a view showing an example of a search result;

FIG. 8 is a view showing an example of a display window generated by the link section;

FIG. 9 is a view showing an example of CM display;

FIG. 10 is a view showing another example of CM display;

DETAILED DESCRIPTION OF THE INVENTION

A preferred embodiment of an information providing apparatus according to the present invention will now be described with reference to the accompanying drawings.

First Embodiment

Figure 1:
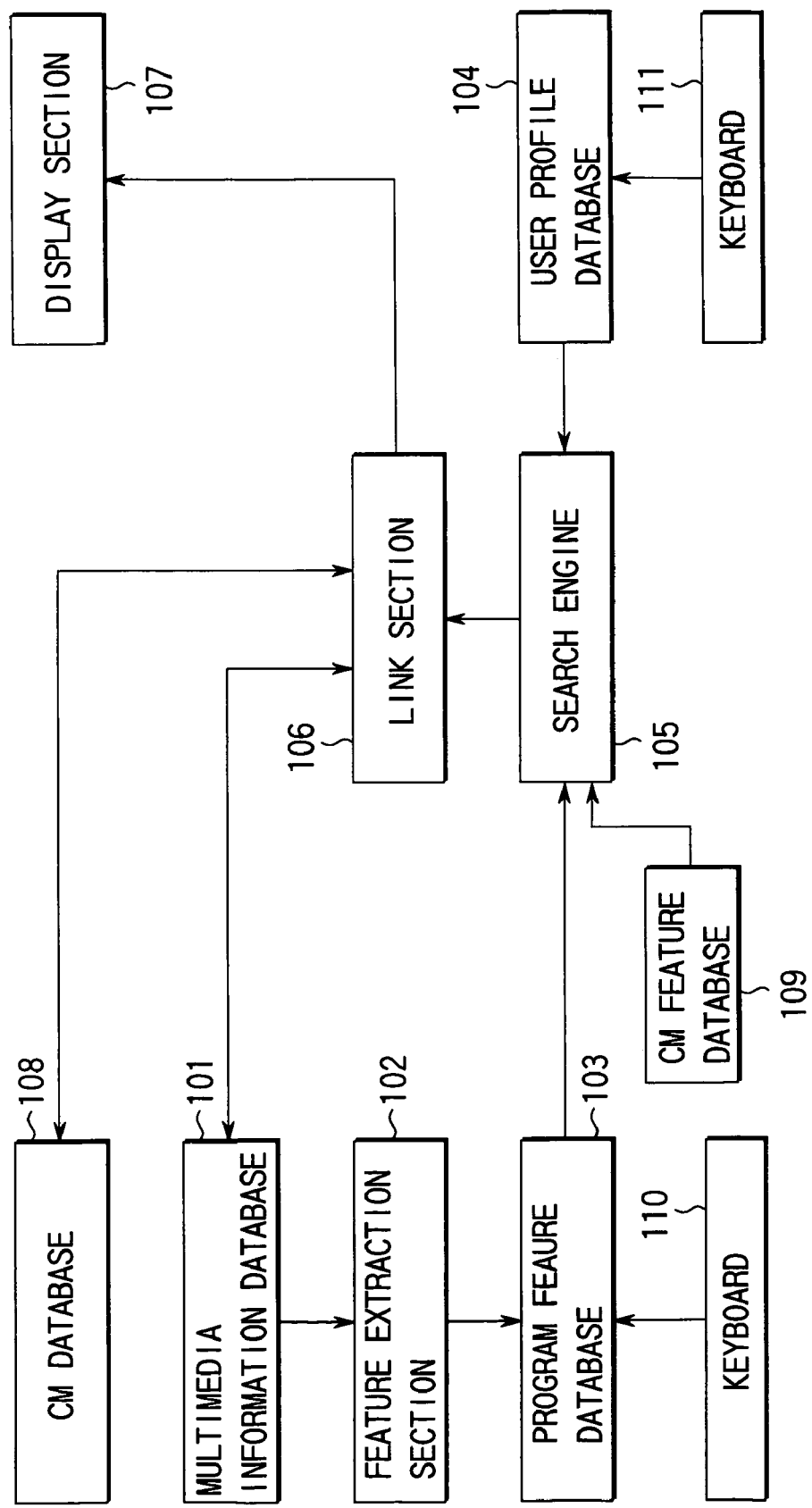
FIG. 1 is a block diagram showing the basic arrangement of an information providing apparatus according to the first embodiment of the present invention.

FIG. 1 is a block diagram showing the basic arrangement of an information providing apparatus according to the first embodiment of the present invention. This apparatus has a multimedia information database 101, commercial message (CM) database 108, program feature database 103, CM feature database 109, and user profile database 104, which are constructed by media capable of random access. The databases are classified for the descriptive convenience. Physically, one database may be used.

The multimedia information database 101 stores a number of multimedia information to be provided. The CM database 108 stores a number of CM information to be provided together with free programs. A CM feature representing the contents of CM information is stored in the CM feature database 109 for every CM information.

The pieces of multimedia information are a number of programs provided by an information provider such as a broadcasting station or the Internet. Analog data is converted into digital data in advance and then stored in the multimedia information database 101 and managed. The digital data can be MPEG-2 compressed data or DV compressed data. The multimedia information have "title names" in units of programs and "frame numbers" in units of frames in each program and are stored in a medium, e.g., a hard disk which can be accessed from an arbitrary position in accordance with a given title name and frame number. The medium is not limited to the hard disk and may be another medium such as a DVD-RAM (ROM) capable of random access. The multimedia information need not maintain the image size and quality of the original analog data. A compression scheme such as MPEG-1 or MPEG-4 that saves the image capacity may be employed depending on the application intended.

The output from the multimedia information database 101 is supplied to a feature extraction section 102. The feature extraction section 102 performs predetermined analysis for all information held in the multimedia information database 101, sorts the information in accordance with the analysis result, and adds program features representing the contents in units of sorts (e.g., in units of frames). The program features are managed by the program feature database 103 in units of sorts.

CM features (CM program units) are known in advance. When CM information is stored in the CM database 108, a corresponding CM feature is stored in the CM feature database 109. However, a program feature is obtained by storing new program information in the multimedia information database 101, reading out the information from the database 101, and then analyzing the information. The program feature may be separately obtained and input to the program feature database 103 by the operator using a keyboard 110. When both the automatic program feature analysis and the determination by the operator are used, a more appropriate feature can be added to the program information (addition of an index).

The feature extraction section 102 performs video analysis and acoustic/speech analysis for multimedia information.

For video analysis, a technique of determining the video data structure on the basis of information of a cut with an instantaneous change in a video scene or camera movement (pan or zoom) using moving image analysis that has conventionally been studied, and obtaining the feature of the video data can be used.

The position where the scene instantaneously changes can be detected by comparing the similarity between frame images of the video data. The similarity can be obtained by calculating the histogram of the frequency of a color in each image and comparing the histograms. A portion with low similarity is a point where the scene instantaneously changes.

To provide a camera movement parameter, optical flows representing the positions of movement of pixels are obtained from two images. Assuming that most optical flows are obtained from the background, the movement of the camera is calculated on the basis of dominant optical flows.

When the camera is panning, most optical flows appear parallel to each other. When the camera is zooming, optical flows point in the direction of a certain point. Details are described in reference (1), Hirotada Ueno, Takafumi Miyabu, and Satoshi Yoshizawa, "Proposal of Interactive Video Editing Scheme Using Recognition Technology", IECE Papers (D-II), VOL. J75-D-II, No. 2, pp. 216–225 and reference (2), Masahiro Shibata, "Video Contents Description Model and Its Application to Video Structuring", IECE Papers (D-II), VOL. J78-D-II, No. 2, pp. 754–764.

With acoustic/speech analysis, music and human voice can be separated from each other because music has few mute portions and frequency components that are absent in human voice, and voice data can be discriminated because human voice has characteristic features reverse to those of music, and male voice and female voice have a pitch difference.

Details of the method of identifying male voice and female voice are described in reference (3), Keiichi Minami, Akihito Akutsu, Hiroshi Hamada, and Yoshinobu Sotomura, "Video Indexing Using Sound Information and Its Application", IECE Papers (D-II), VOL. J81-D-II, No. 3, pp. 529–537, and a detailed description thereof will be omitted.

With this method, video data is sorted from the video information and speech information, and a feature can be added to each sort.

For example, sound data is analyzed to separate a music portion from a portion of male/female voice. Then, a video scene associated with the sound data is discriminated into a scene associated with the music portion, a scene associated with male voice, and a scene associated with female voice, and features are determined for the respective scenes.

If character data associated with video data accompanies the video data, the text is analyzed to determine the feature. In the U.S.A., video data contains character data called a closed caption. If such data can be used, text analysis using the conventional natural language processing technology can be performed to determine the feature according to the contents.

That is, on the basis of character data accompanying an image, a feature based on the analysis result of character data contents associated with video data can be added in units of sorts.

The user profile database 104 is a file in which information (user profile) of the taste or the field of interest of each user is registered, and managed in units of users. The user profile is prepared by inquiring the user or obtaining information through a questionnaire in advance. As shown in FIGS. 2A to 2E, the user profile has text information and includes keywords representing the taste and the field of interest of a user. FIG. 2A shows taste information associated with the type of programs, FIG. 2B shows taste information associated with the contents of programs, FIG. 2C shows taste information associated with production of programs, FIG. 2D shows the personal profile, and FIG. 2E shows keywords/key phrases representing the taste. FIG. 2A shows information of the program categories or genres such as suspense, drama, documentary, sports, variety, and news. FIG. 2B shows the types of scenes in one program. For example, a movie has information of favorite scenes such as an action scene, love scene, and climax scene. A news has information of politics, economy, sports, city news, and the like. FIG. 2C shows information of persons who produce programs, e.g., movie directors, actors, actresses, composers of music used in movies, lyric writers, and arrangers. Information of production areas are also included. FIG. 2D shows personal information such as the age, sex, occupation, birthplace (or home town), and birthday. FIG. 2E shows keywords and key phrases representing the taste of the user, e.g., various keywords and key phrases including a favorite food, favorite matter, favorite sport, hobby, and favorite proverb. In FIGS. 2A to 2E, a number in parentheses represents the number of items of taste. If a plurality of items are listed, the items are arranged in the order of priority.

A search engine 105 searches the program feature database 103 and CM feature database 109 to select a feature matching the user profile in the user profile database 104. This makes it possible to find out the information portion of user's interest. To search for that portion, a matching feature is detected on the basis of the keywords in the user profile. In this keyword matching, features matching keywords similar to the user profile can also be detected using a thesaurus (dictionary of synonyms or taxonomy, or index for information search). The thesaurus also includes a dictionary considering differences in usages of language between countries or areas or gaps between sexes or generations (i.e., dictionary for eliminating the differences or gaps).

With the search engine 105, associated video data can be finely specifically identified/searched in units of scenes, units associated with speech data, or units associated with character data, so a partial image of each user's interest can be selected and extracted.

The search engine 105 supplies the search result to a link section 106.

The link section 106 processes the information to reproduces it. That is, the link section 106 associates the information in the CM database 108 and the result of search and reproduce the partial image according to the user profile.

A display section 107 displays the image reconstructed by the link section 106. The display section 107 includes a loudspeaker for reproducing music information.

An outline of the basic arrangement of this system has been described above.

Methods of implementing the individual processing will be described below in detail.

Figure 3:
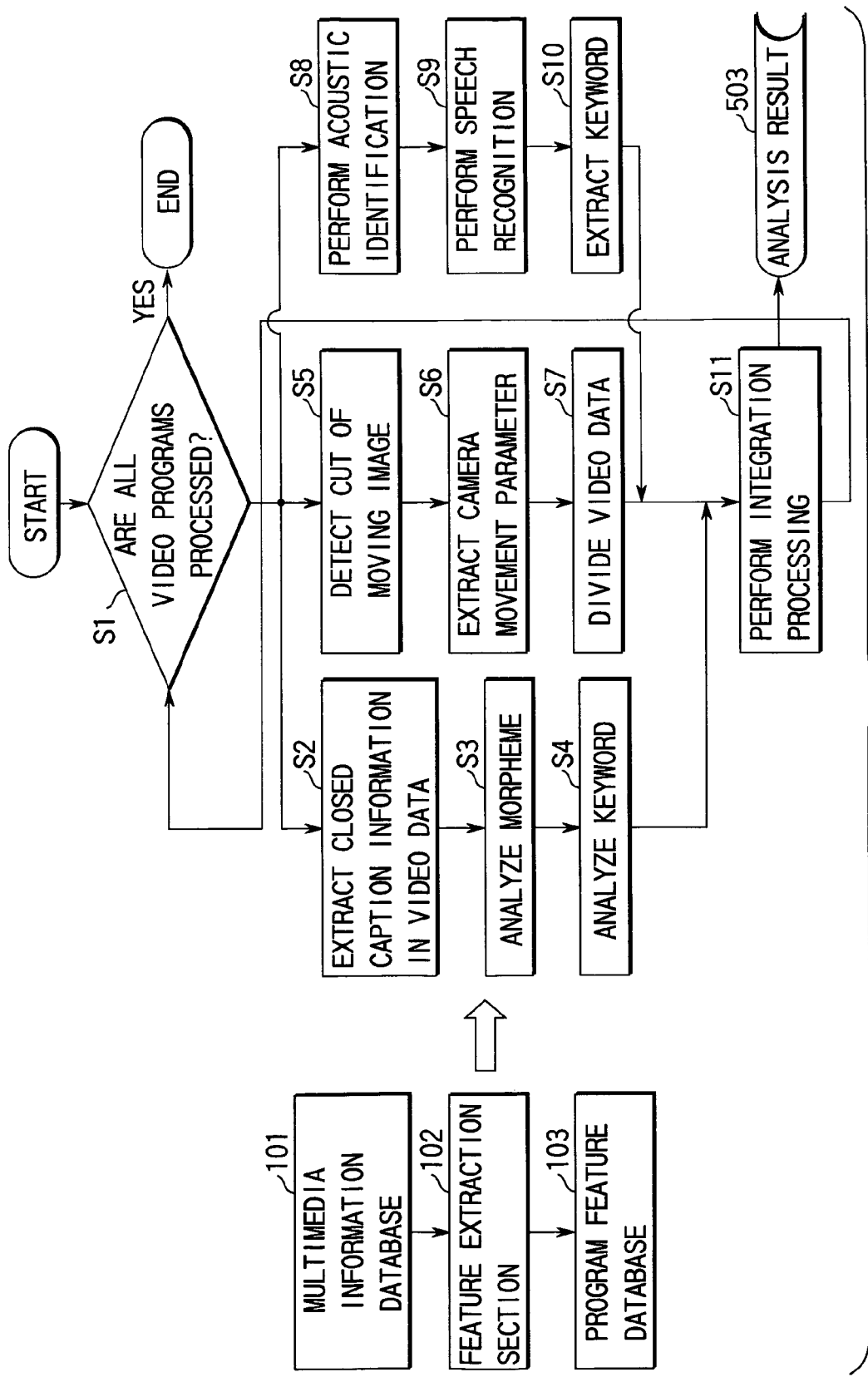
FIG. 3 is a flow chart showing the operation of a feature extraction section.

Details of processing by the search engine 105 will be described with reference to FIG. 3. FIG. 3 shows the flow of processing so as to explain details of processing by the feature extraction section 102.

The feature extraction section 102 can analyze all multimedia information stored in the multimedia information database 101, analyze each information not in units of programs but in units of frames, and obtain a feature.

Multimedia information contains not only image data but also sound and text data. Hence, analysis of multimedia information is performed in three steps: text analysis, moving image analysis, and acoustic/speech analysis. The processing order is not particularly limited.

For text analysis, closed caption information in the video data is extracted (steps S1 and S2), morphemes are analyzed (step S3), and keywords are analyzed on the basis of the morpheme analysis result (step S4). This analysis is performed for all video programs in the multimedia information database 101.

For moving image analysis, a cut of a moving image in video data is detected (steps S1 and S5), the camera movement parameter is extracted (step S6), and the video data is segmented on the basis of the camera movement parameter (step S7). This analysis is performed for all video programs in the multimedia information database 101.

For acoustic/speech analysis, acoustic identification is performed in video data (steps S1 and S8), speech recognition is performed (step S9), and keywords are extracted on the basis of the recognition result (step S10). This analysis is performed for all video programs in the multimedia information database 101.

Text analysis, moving image analysis, and acoustic/speech analysis produce analysis results.

By video analysis according to these procedures, various feature information are obtained in association with the multimedia information. The pieces of feature information are processed by high-level integration processing (step S11) of integrating the individual information.

For text analysis, moving image analysis, and acoustic/speech analysis, conventionally known analysis technologies can be used, as has already been described above.

For example, in text analysis, a closed caption contained in video data is extracted, and the roles of words are analyzed by morpheme analysis. An important keyword such as a proper noun describing a scene is extracted from the words. As the keyword, not only a proper noun but also information representing a high frequency of occurrence is also used.

In moving image analysis, video data is segmented by extracting a scene with an abrupt change or camera movement information (reference (1)). In acoustic/speech analysis, music data and speech data are separated by speech identification, male voice and female voice are separated by speech recognition (reference (3)), and a keyword is extracted using speech recognition.

Integration processing aims at storing feature information obtained by the individual processing as a database in association with each other and integrating the feature information to generate new feature information.

For example, processing of associating individual processing is performed in the following way.

Assume that processing is to be performed in units of segmented video data, and a keyword as an important proper noun is present in the video data. Even when the keyword is obtained from the caption (comment or explanation), video frames corresponding to the position of the keyword cannot be accurately known.

The position of the keyword is identified using speech recognition, and the keyword is added to a partial image at a position with consecutive speech data as a feature.

The analysis result is generated as a table as shown in FIG. 4. In the table shown in FIG. 4, the title of the program is "news", keywords as features representing the characters or situation are "politics", "economy", and "weather forecast", and "0:00–0:05", "0:15–0:16", and "0:23–0:25" are picked up as window appearance times (frames) associated with the respective keywords. That is, video data is segmented in reference to time (frames) in units of program titles, and important keywords (features) appearing in the frames are added to form a table.

Figure 5:
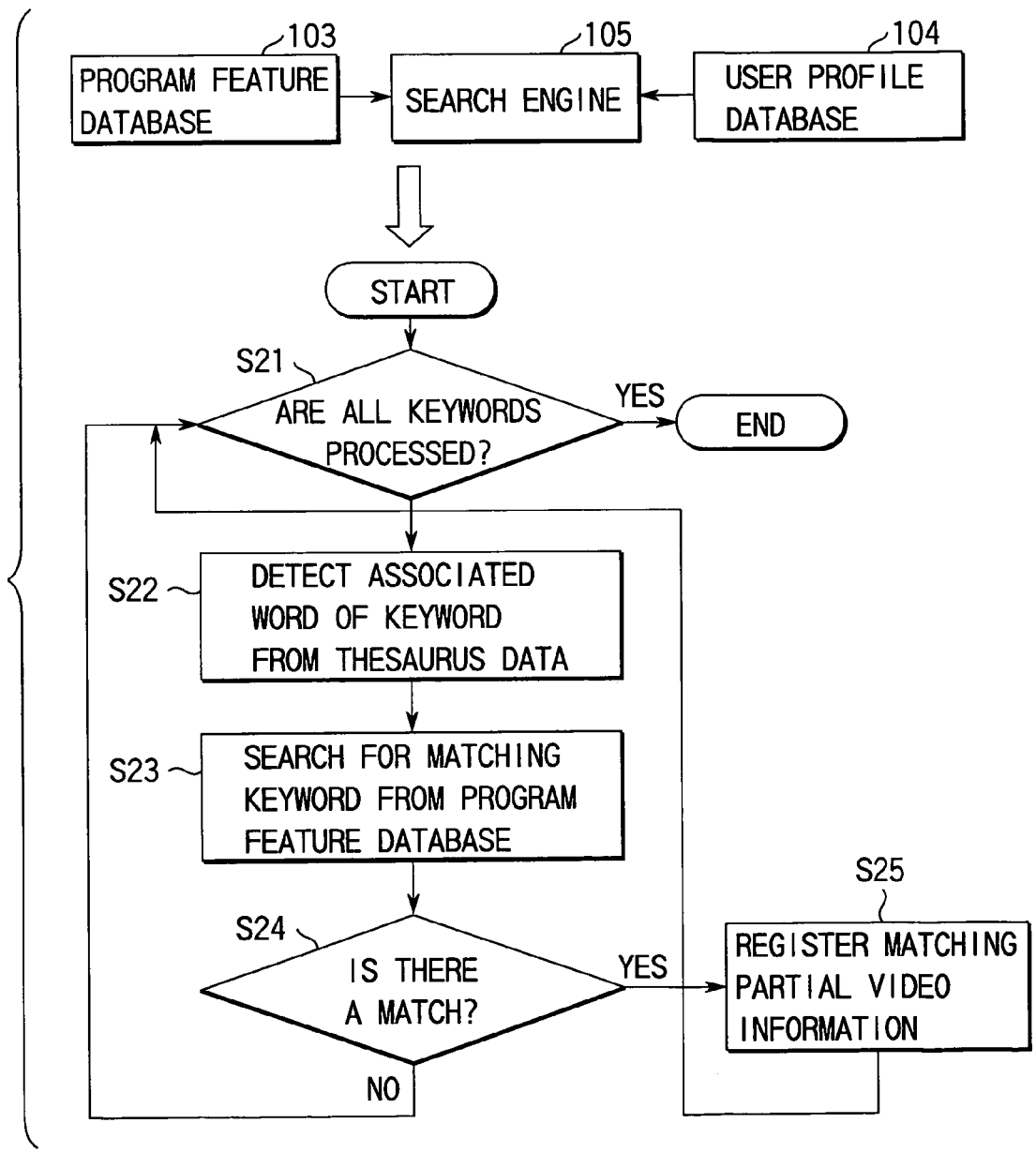
FIG. 5 is a flow chart showing the operation of a search engine.

Details of processing by the search engine 105 will be described next with reference to FIG. 5. Search associated with program information will be described below. This also applies to search associated with CM information. The search engine 105 looks up information in the program feature database 103 and user profile database 104 to extract features of user's interest, thereby selecting corresponding partial video data.

Keywords are selected from the user profile database 104 one by one, and associated words are picked up using the thesaurus dictionary (steps S21 and S22).

After picking up the associated words, the picked up associated words are compared with keywords represented in the features stored in the program feature database 103. If a word and keyword match with each other, information representing the position of the partial video data and the title to which the frame belongs is recorded (steps S23, S24 and S25). In keyword matching, if the same associated word recurs, it is compared upon each occurrence.

Processing by the search engine 105 has been described above in detail.

FIG. 6 shows an information example of partial video data acquired by keyword matching and registered in step S25. In this case, one keyword in the user profile database 104 is "shopping". Information of shopping are searched for using thesaurus data, and keywords such as "department store", "bakery", etc., are selected and compared with keywords in the program feature database 103 to provide information of corresponding video data as shown in FIG. 6.

The above description has been made about only selection of multimedia information. CM information can be selected in the same way as described above.

Figure 7:
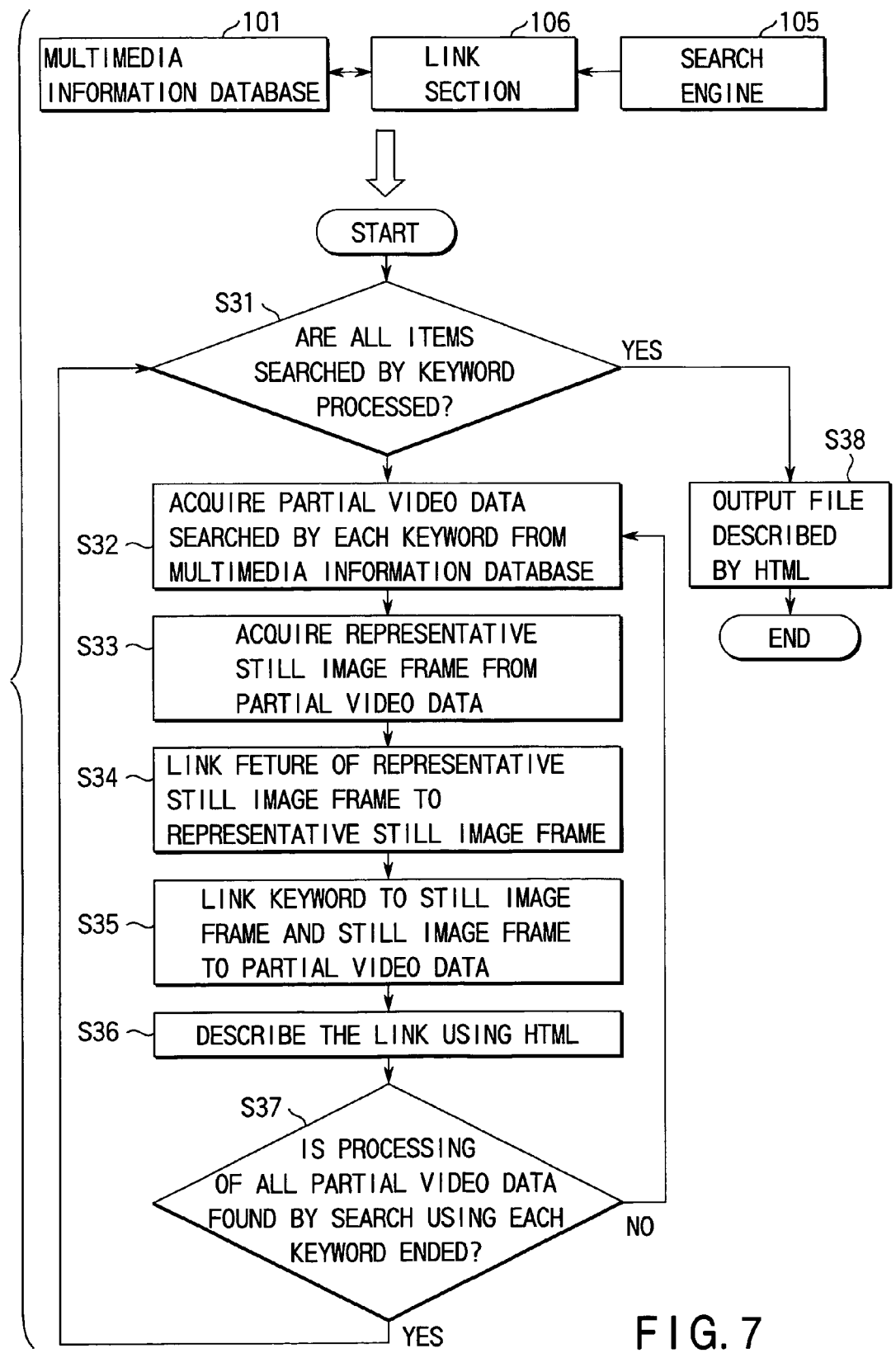
FIG. 7 is a flow chart showing the operation of a link section.

Details of the link section 106 will be described next with reference to the flow chart shown in FIG. 7. The link section 106 obtains information shown in FIG. 6 from the search engine 105 and constructs, from these information, a display window (index window) for providing information. In this case, thumbnail images as shown in FIG. 8 are displayed.

First, it is determined whether processing for all keywords is ended (in the example shown in FIG. 8, keywords are "shopping", "public facility", "transportation/bank", and "health/hospital"). If processing is not ended, processing is continued (step S31). Partial video data selected in association with one keyword is acquired from the multimedia information database 101 (step S32). To acquire partial video data from the multimedia information database 101 by random access at a sufficiently high speed, time code information (frame information) can be directly used. Otherwise, a copy or partial video data, partial video data with a reduced window size, or a copy of partial video data using a different compression ratio or compression scheme is acquired.

One or a plurality of frames of acquired partial video data are acquired as representative images (step S33) and used as materials to construct the window. The feature of each representative image is associated with the representative image, and the representative image is associated with the partial video data (steps S34 and S35). Information of the representative image is described using the HTML (step S36).

When partial video data selected in accordance with a keyword is processed, the next keyword is processed. Otherwise, the above processing is repeated (step S37).

It is determined whether processing for all keywords is ended (step S31). If processing for all keywords is ended, the contents described by the HTML are sent to the output or display section (step S38). Otherwise, processing is continued.

FIG. 8 shows an example of a window generated by the link section 106 in the above-described manner. In this example, keywords in the user profile are "shopping", "public facility", "transportation/bank", and "health/hospital". Therefore, partial video data of programs associated with words such as "department store" and "bakery" associated with "shopping" are acquired, and representative images each forming one frame of partial video data are pasted in line like indices. CMs arranged sporadically are advertisements of sponsors. CMs can also be selected on the basis of matching between program features and the user profile, like program information. Hence, CMs best associated with the selected multimedia information can be selected. In the window shown in FIG. 8, each representative image is linked to corresponding partial video data such that the partial video data is displayed by a click button.

To generate such a window, a necessary description is prepared using HTML. HTML is an abbreviation for HyperText Markup Language, which indicates a page description language used as the general format of information provided by the WWW or W3 (World Wide Web) service of the Internet. HTML is based on SGML (Standard Generalized Markup Language) and can designate the logical structure of a document and link between documents by inserting a markup called a "TAG" in the document.

WWW is a client/server information service in the Internet. A network user can access information using a dedicated Web browser. Provided information are HTML documents called homepages, Web pages, or WWW pages connected by hyper link. Information can be displayed by tracking the link.

Documents handled by WWW can include multimedia information, and the server side can execute a program to perform special processing therefore. This function can be used to provide a unique information search service.

In the above-described example, HTML documents are used to display CMs together with selected programs. A method of displaying CMs when displaying selected programs or part of programs as video data will be described next.

In the example shown in FIG. 9, a CM banner advertisement is displayed together with program video data. While displaying video data, a banner advertisement is displayed on the lower side of the program video data. In this case as well, the window can jump to a corresponding WWW page in accordance with an instruction from the user.

As shown in FIG. 10, CM video data may be displayed as a subwindow of the program video data window. In this method as well, the linked WWW page can be used.

As described above, since a CM best associated with a scene of a program or a CM associated with user's taste can be selected in accordance with keywords associated with a scene of the selected program or user's taste, an advertisement can be effectively displayed.

As described above, according to this embodiment, at least one of moving image analysis, acoustic/speech analysis, and text analysis is applied to the database storing multimedia information and multimedia information provided from the database, the multimedia information are sorted on the basis of the analysis result, and the analysis result is managed in units of sorts. The analysis result is searched in accordance with the user profile, partial information of multimedia information according to user's taste are selected, and the selected partial images are associated with each other, reconstructed, and provided to the user.

According to this embodiment, an information providing method and apparatus and an information reception apparatus capable of appropriately selecting and providing only portions of user's actual interest from a number of multimedia information instead of filtering in units of programs are provided. This eliminates a disadvantage of the prior art in which even a program that the user wants to watch only partially need be entirely recorded or watched.

Since CMs can also be stored in a database like program information and selected like program information, viewers surely watch CMs that the program provider wants the viewer to watch. In addition, since CMs are selected in accordance with user's taste or interest, the effect of the advertisements can be increased. This eliminates a disadvantage of the prior art in which when only part of video data is extracted for recording or watching, CMs that the program provider wants the viewer to watch are omitted.

Other embodiments of the present invention will be described below. The same reference numerals as in the first embodiment denote the same parts in the following embodiments, and a detailed description thereof will be omitted.

When the broadcasting receiving device of a user performs the series of processing operations of the first embodiment, i.e., processing of analyzing multimedia information stored in a database, managing features of program information as the analysis result using a database, reading out partial information of appropriate multimedia information from the database in accordance with the user profile, associating them with each other, and reconstructing and providing them, the processing amount is too large to result in overload. To solve this problem, a server/client system is built to perform some processing operations in the server.

Figure 11:
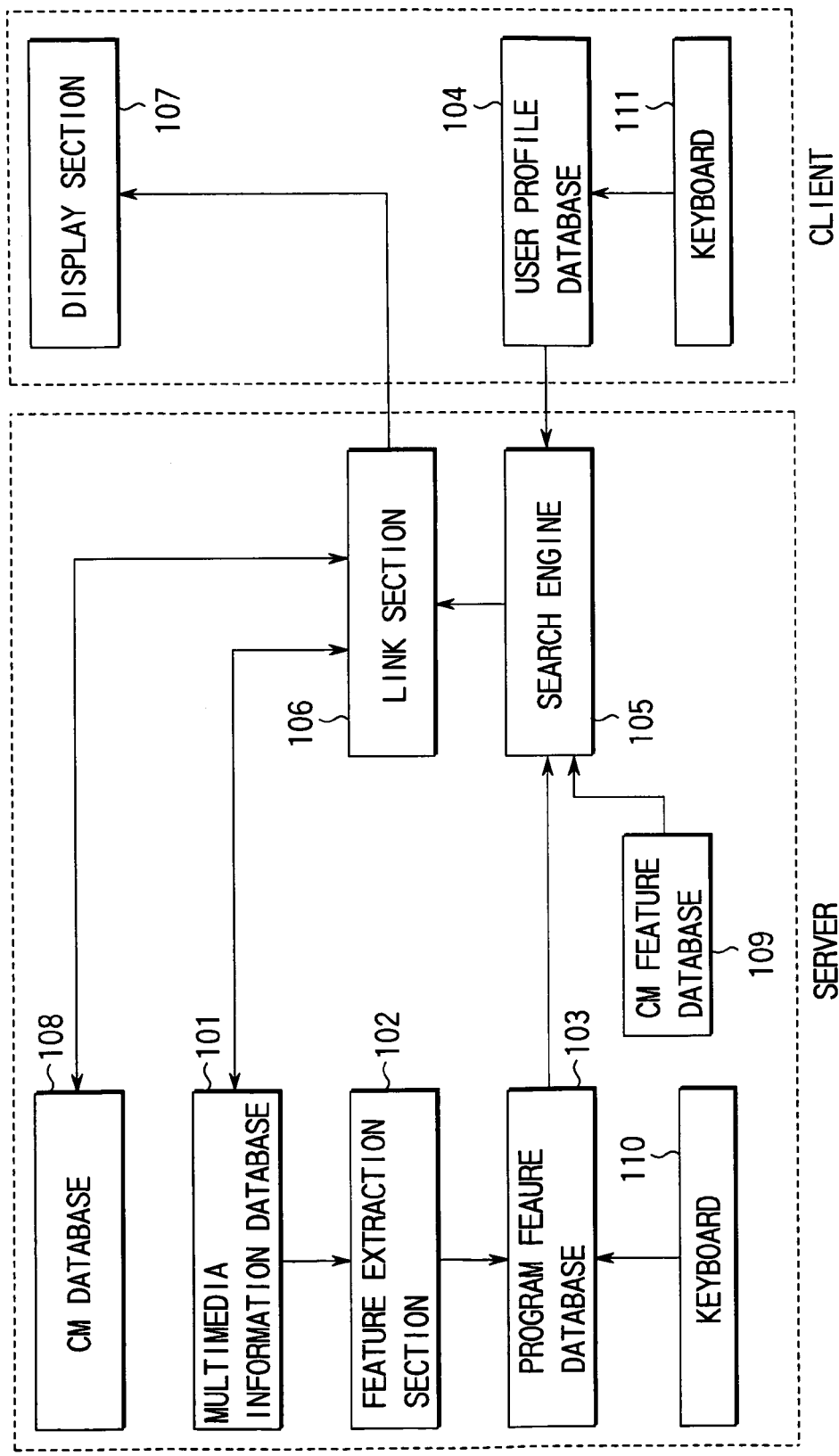
FIG. 11 is a block diagram showing the first modification of the first embodiment applied to a server/client system.

FIG. 11 shows a server/client system according to the first modification of the first embodiment. In this case, the multimedia information database 101, CM database 108, feature extraction section 102, program feature database 103, CM feature database 109, search engine 105, link section 106, and keyboard 110 are on the server side, and the display section 107, user profile database 104, and keyboard 111 are on the client side.

Figure 12:
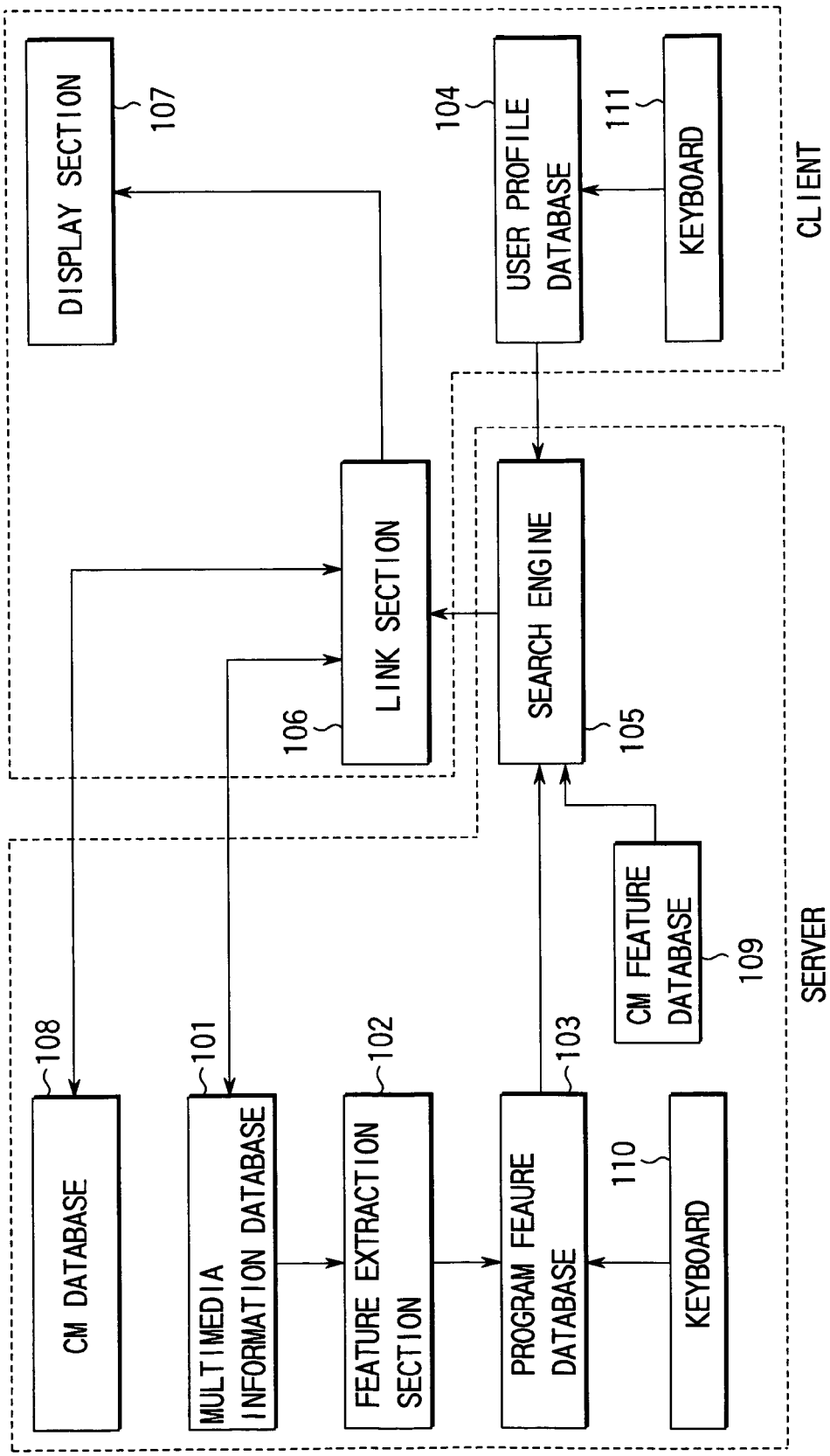
FIG. 12 is a block diagram showing the second modification of the first embodiment applied to a server/client system.

FIG. 12 shows a server/client system according to the second modification of the first embodiment. In this case, the multimedia information database 101, CM database 108, feature extraction section 102, program feature database 103, CM feature database 109, search engine 105, and keyboard 110 are on the server side, and the link section 106, display section 107, user profile database 104, and keyboard 111 are on the client side.

Figure 13:
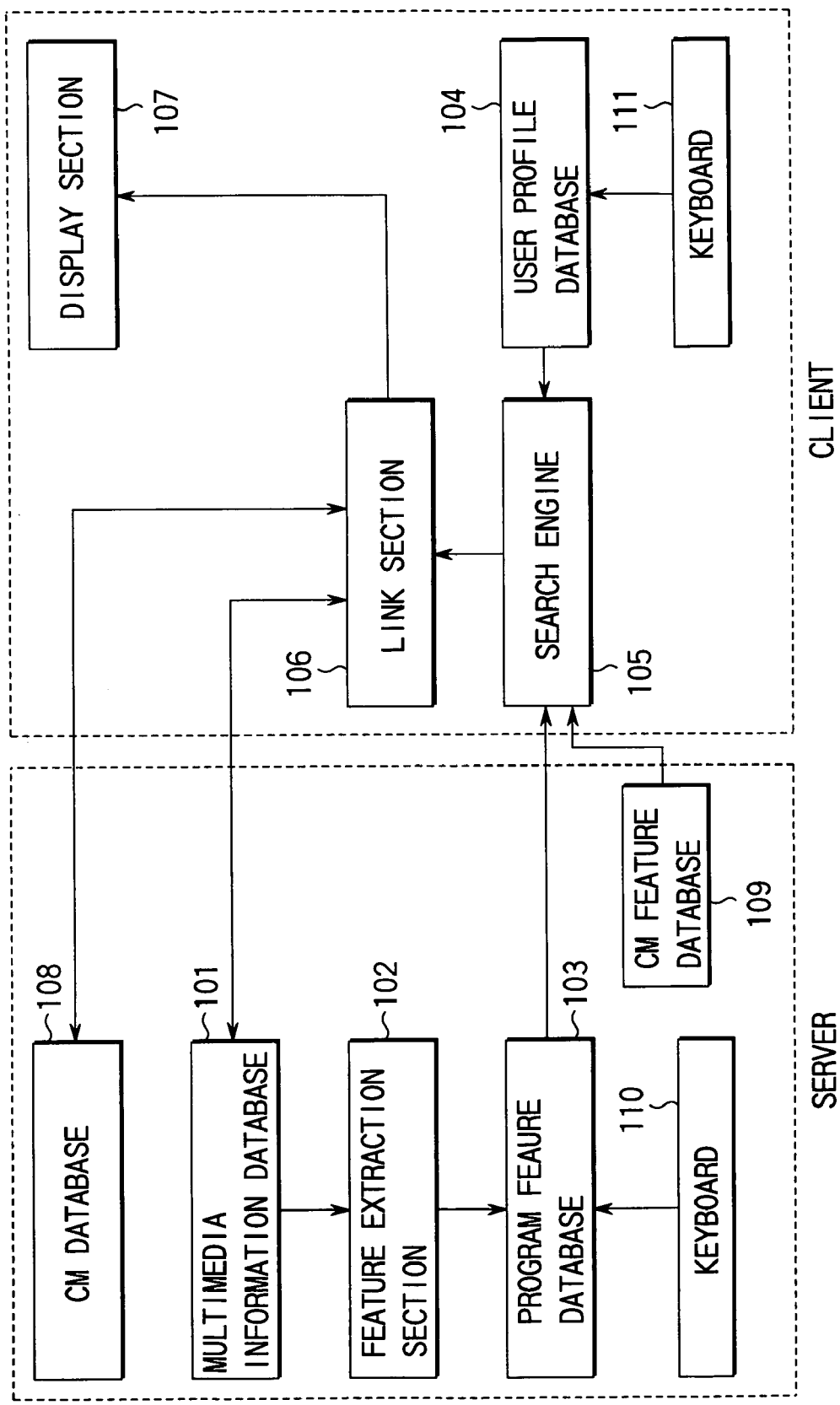
FIG. 13 is a block diagram showing the third modification of the first embodiment applied to a server/client system.

FIG. 13 shows a server/client system according to the third modification of the first embodiment. In this case, the multimedia information database 101, CM database 108, feature extraction section 102, program feature database 103, CM feature database 109, and keyboard 110 are on the server side, and the search engine 105, link section 106, display section 107, user profile database 104, and keyboard 111 are on the client side.

When the system of the first embodiment is constructed using a server/client system, only a section which stores a user profile and a section which sends it to the server and a section which receives a search result from the server and a section which displays it are on the client side, as shown in FIG. 11. Alternatively, a link section being based on the basis of the search result is also arranged on the client side, as shown in FIG. 12, or a searching section is also arranged on the client side, as shown in FIG. 13. The range of functions provided on the client side depends on the processing capability of the client. When all sections except the databases 101, 103, 108, and 109 and feature extraction section 102 are on the client side, as shown in FIG. 13, the client must download the processing result. Hence, in this arrangement, the range of functions depends on not only the processing capability of the client but also the information storage capability and line capability for download. However, since processing operations can be distributed, this arrangement is effective when the line is a CATV, an optical fiber, or intranet.

Second Embodiment

In the present invention, the features of video data can be managed not in units of programs but in units of frames. This enables rating survey in units of frames and solves a problem of conventional rating survey in units of programs. Hence, viewing history usable for analysis of user's taste or interest can be obtained.

Figure 14:
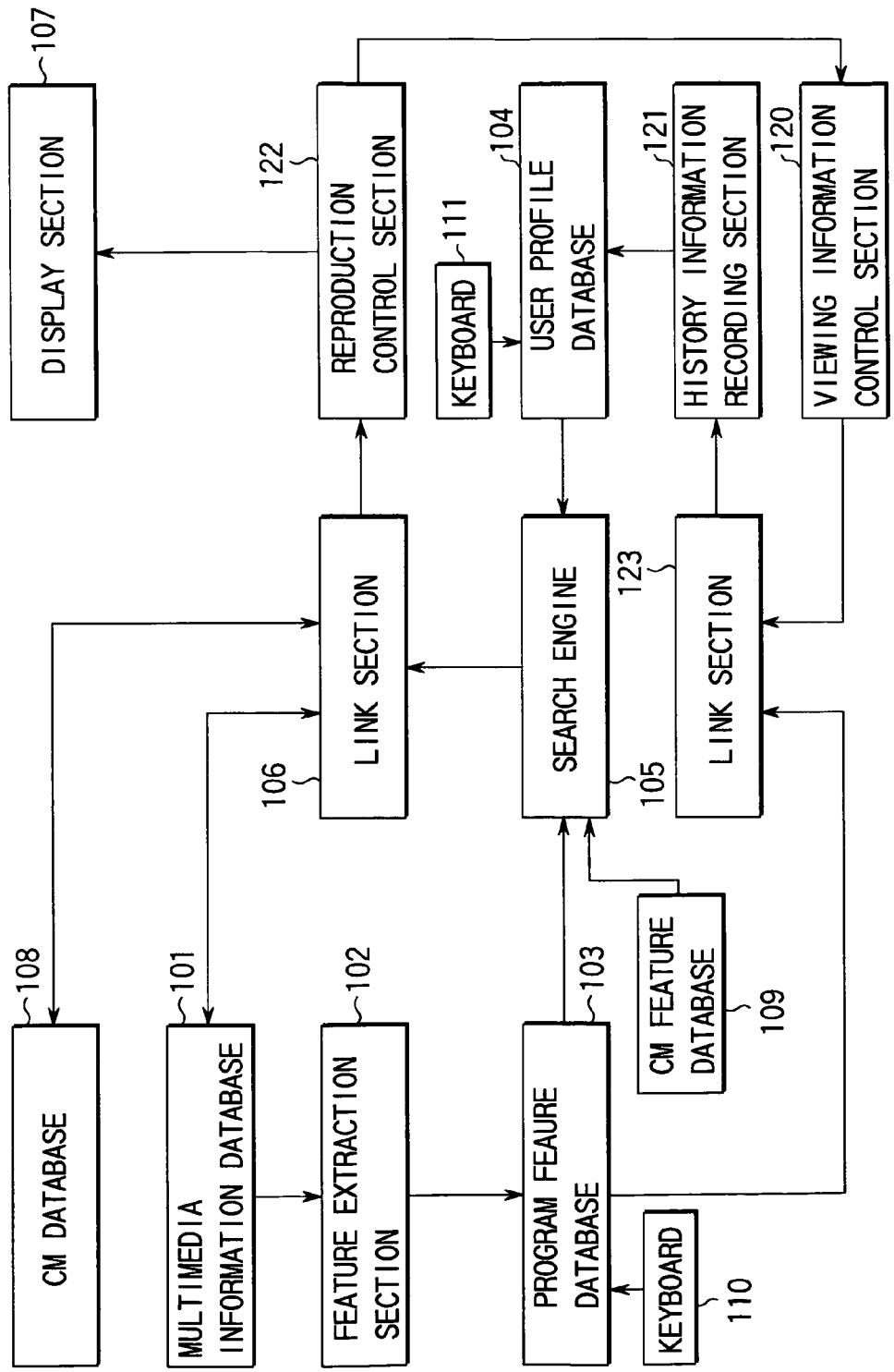
FIG. 14 is a block diagram showing the basic arrangement of an information providing apparatus according to the second embodiment of the present invention.

FIG. 14 is a block diagram showing the system arrangement of the second embodiment capable of recording viewing history in units of frames. This system has, in addition to the system of the first embodiment shown in FIG. 1, a viewing information control section 120, history information recording section 121, reproduction control section 122, and link section 123. The viewing information control section 120 acquires, from the reproduction control section 122, viewing information when a user has watched an information program (media) and transmits the information to the link section 123. The link section 123 reads out a program feature corresponding to the viewing information from the program feature database 103, corresponds them with each other, and supplies them to the history information recording section 121. The viewing information contains information of the watched multimedia information and information representing the scenes watched and the number of watches.

The history information wherein the viewing information and the program feature are corresponded to each other may be recorded in the recording section 121 and simultaneously uploaded to the program provider (server) side. Alternatively, the history information may be uploaded to an external database (database of the manager on the server side) when the history information for a predetermined period or a predetermined amount of the history information is recorded in the history information recording section 121. The viewing information and the video data may be corresponded to each other to provide the history information representing only watched video data, watched time sections, and frequencies of watches. Alternatively, using section information of a scene of video data or index information, statistical information of watched scenes and frequencies of watches may be acquired to provide the history information.

In a server/client system, the history information recording section 121 is preferably located in the same site as that of the viewing information control section 120. However, various changes and modifications can be made as will be described below.

Figure 15:
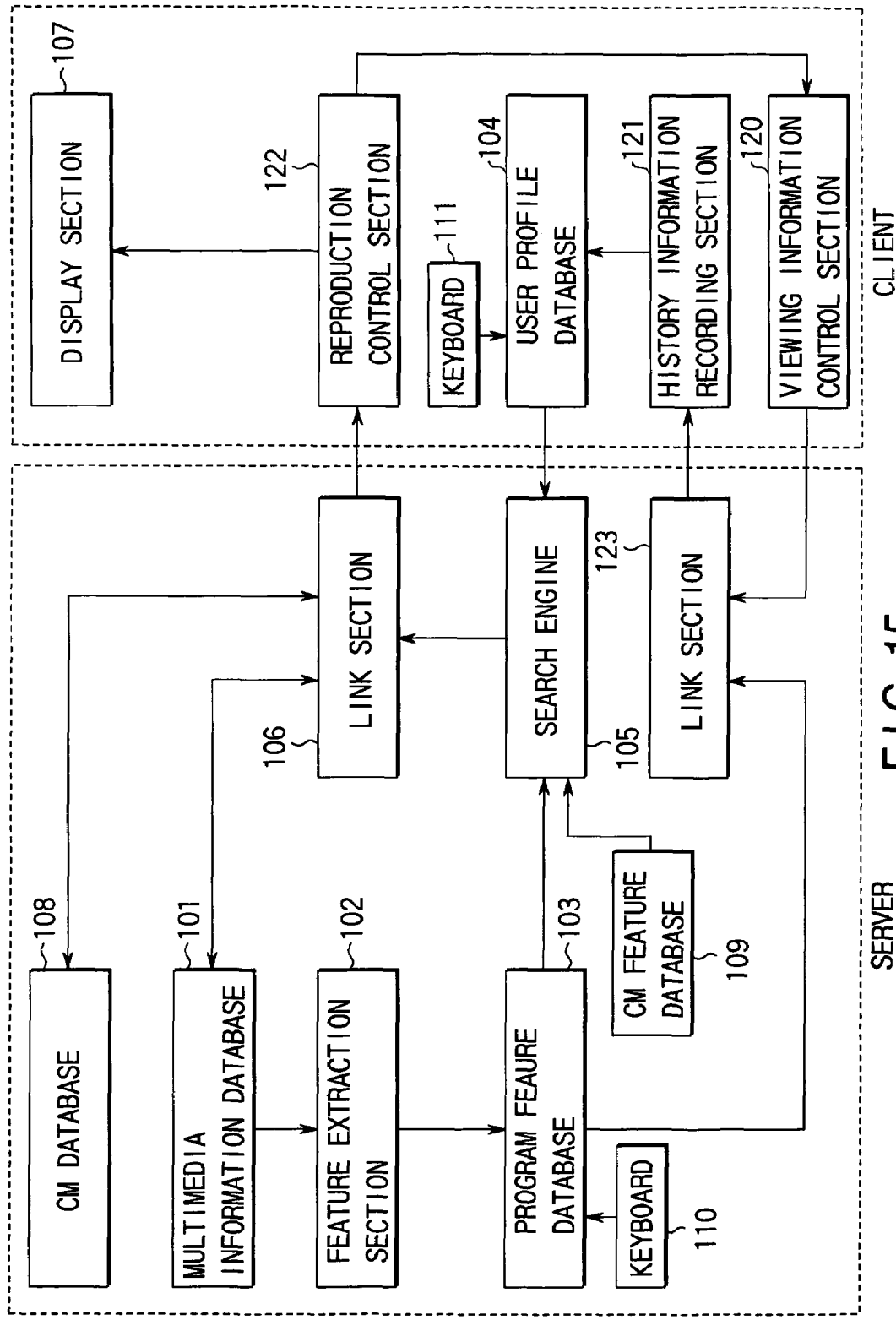
FIG. 15 is a block diagram showing the first modification of the second embodiment applied to a server/client system.

FIG. 15 shows a server/client system according to the first modification of the second embodiment. In this case, the multimedia information database 101, CM database 108, feature extraction section 102, program feature database 103, CM feature database 109, search engine 105, link section 106, link section 123, and keyboard 110 are on the server side, and the display section 107, user profile database 104, viewing information control section 120, history information recording section 121, reproduction control section 122, and keyboard 111 are on the client side.

Figure 16:
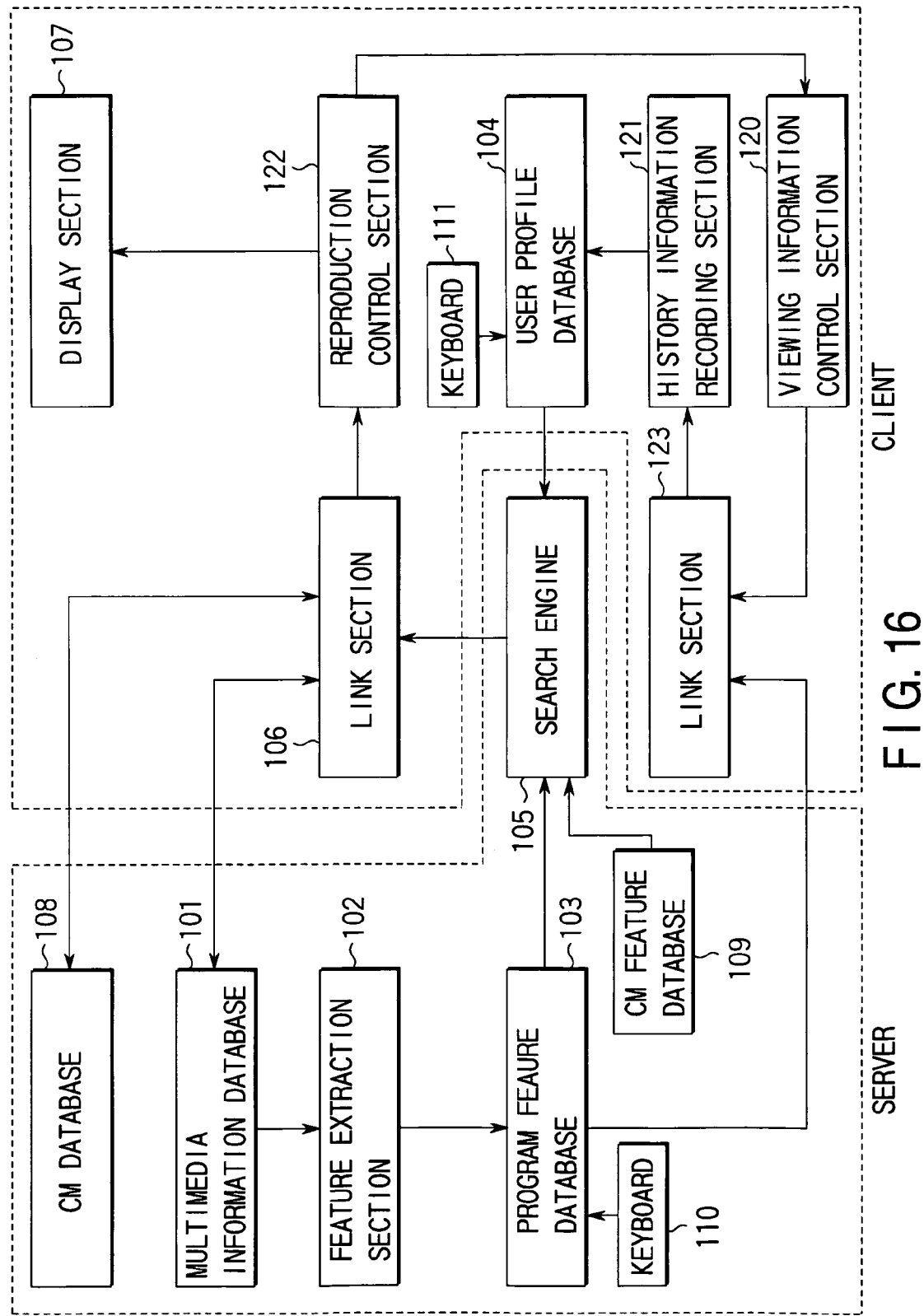
FIG. 16 is a block diagram showing the second modification of the second embodiment applied to a server/client system.

FIG. 16 shows a server/client system according to the second modification of the second embodiment. In this case, the multimedia information database 101, CM database 108, feature extraction section 102, program feature database 103, CM feature database 109, search engine 105, and keyboard 110 are on the server side, and the display section 107, user profile database 104, viewing information control section 120, history information recording section 121, reproduction control section 122, link section 106, link section 123, and keyboard 111 are on the client side.

Figure 17:
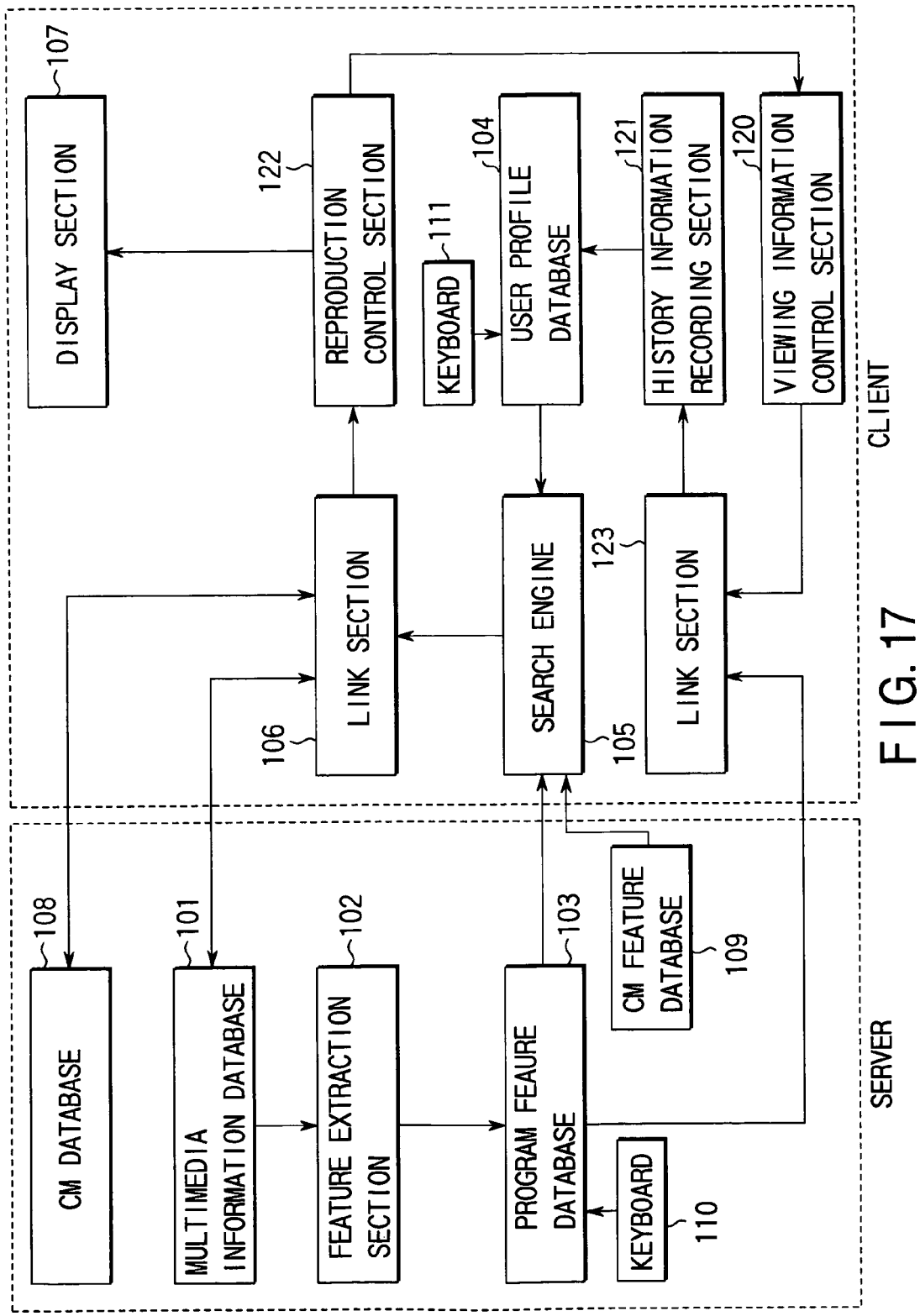
FIG. 17 is a block diagram showing the third modification of the second embodiment applied to a server/client system.

FIG. 17 shows a server/client system according to the third modification of the second embodiment. In this case, the multimedia information database 101, CM database 108, feature extraction section 102, program feature database 103, CM feature database 109, and keyboard 110 are on the server side, and the display section 107, user profile database 104, viewing information control section 120, history information recording section 121, reproduction control section 122, link section 106, link section 123, search engine 105, and keyboard 111 are on the client side.

Figure 18:
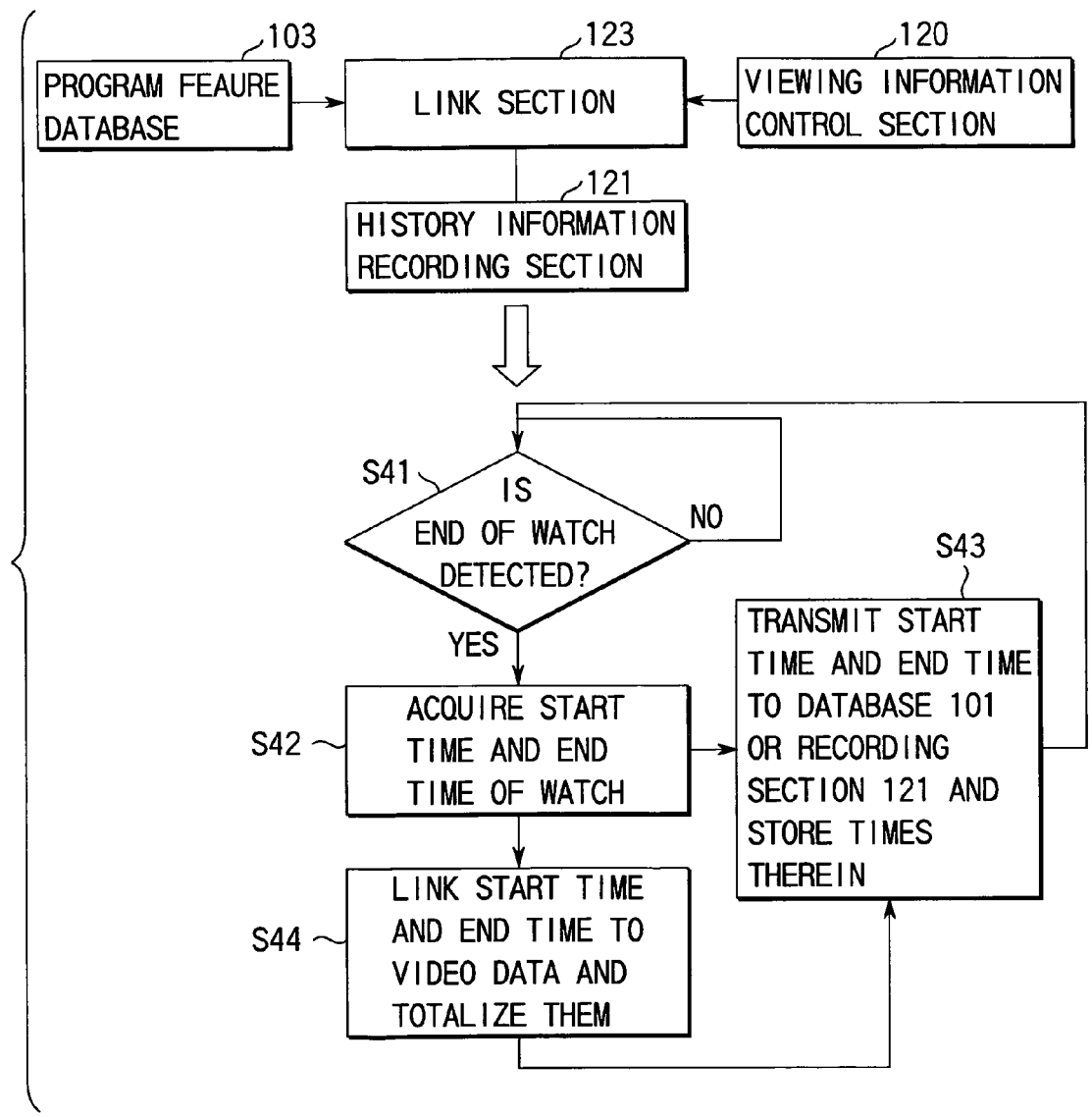
FIG. 18 is a flow chart showing the operation of a viewing history recording section.
Figures 19A, 19B, 20:
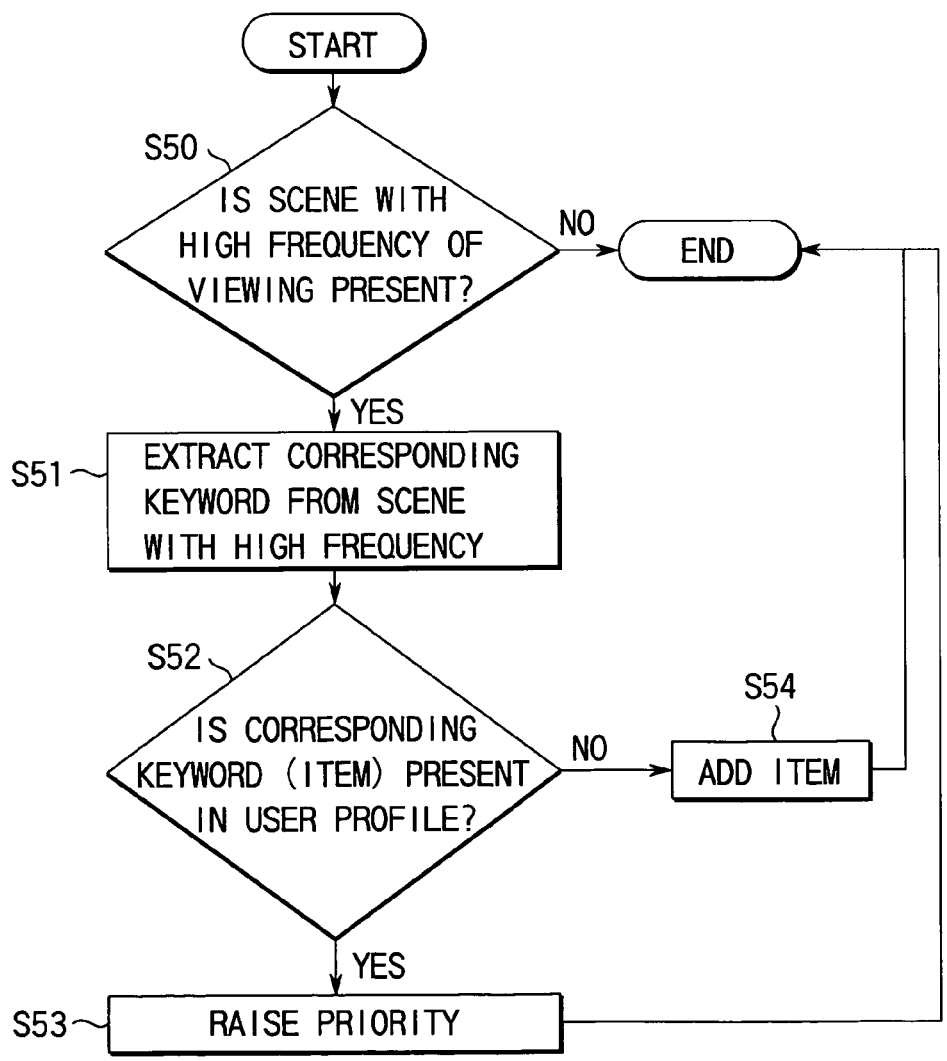
FIGS. 19A and 19B are views showing an example of a viewing history.
FIG. 20 is a flow chart showing the user profile update operation.

FIG. 18 shows the processing flow of the link section 123. When the viewing information of a viewer is supplied from the reproduction control section 122, the viewing information control section 120 holds the start time and end time of watch. Even when the channel is changed, the viewing information control section 120 determines an end and start of watch are generated. When watch is ended, the end is detected (step S41), and the watch start time and the watch end time paired with the start time are acquired (step S42). The information may be directly sent to the multimedia information database 101 or history information recording section 121 and recorded (step S43). In that case, the recording data is recorded using the ID of the video data, start time, and end time, as shown in FIG. 19A. As another method, scenes of video data, which were viewed, are acquired by the link section 106 (step S44). As shown in FIG. 19B, a video data ID and a scene ID are processed to provide information of frequency of watches, and the information is sent to the multimedia information database 101 or history information recording section 121 and recorded. The totalization method is not limited to this. The frequency may be calculated for each genre or each keyword independently of video data IDs or program IDs. The frequency can be calculated by counting "1" when the user has watched a scene once or weighting it in accordance with the length of time of watch.

With this processing, the audience behavior can be grasped in units of frames, and user's taste or interest can be surely known.

Therefore, the information in the user profile database 104 may be updated on the basis of the history information recorded in the history information recording section 121. FIG. 20 shows this processing flow. First, the history information recording section 121 extracts a scene with a high frequency of watches from history information of a user (step S50), and a feature (keyword) corresponding to the scene is extracted (step S51). It is determined whether the profile data of the user in the user profile database 104 has a corresponding keyword (item) (step S52). If YES in step S52, the priority of the keyword in the user profile data is raised (step S53). If NO in step S52, the item is added to the user profile data (step S54).

As described above, according to the second embodiment, a program and scenes thereof, which are watched by the user, and the number of watches are recorded as history information simultaneously as the viewer watches the program. Since the user profile is rewritten in accordance with the history information, a user profile that appropriately reflects user's taste and interest can be obtained, and information of user's interest can be selectively provided to the user. The history information can be acquired not in units of programs but in units of scenes of a program. Therefore, the relationship between user's taste and the scenes and contents of the program can be analyzed in detail. When the history information is automatically uploaded from the client side to the server side, cumbersome acquisition can be automatically performed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

As has been described above, according to the present invention, only video data of portions which are actually required by the user who is watching the program can be recorded or reproduced without recording or reproducing the entire program. In addition, partial video data (video data in units of sorts) are associated with each other and reconstructed to result in visually convenient display. Furthermore, commercial messages are also selectively provided in accordance with user's taste. Hence, even when only part of video data is selected and recorded or watched, commercial messages that the program provider wants the viewer to watch are not omitted, unlike the prior art.

What is claimed is:

1. An information providing method comprising:
    forming a program database by dividing multimedia information into plural partial information formed of a frame or frames, and respectively adding program feature data representing respective contents of the plural partial information to the plural partial information to thereby respectively store the plural partial information with the added program feature data in the program database;
    searching for the partial information which accords with user profile data from the program database based on matching between the user profile data and the program feature data; and
    reading out the searched partial information from the database and providing the searched partial information to a user.

2. The method according to claim 1, wherein each plural partial information includes representative images of a respective multimedia information.

3. An information describing method according to claim 1, further comprising:
    storing the user profile data; and
    updating the user profile data based on a result of a search by adding an item of information corresponding to the searched partial information to the user profile data.

4. The method according to claim 2, further comprising:
    adding commercial feature data to commercial information to form a commercial database; and
    providing, to the user, commercial information which accords with the user profile data based on matching between the user profile data and the commercial feature data when providing said searched partial information to the user.

5. The method according to claim 3, wherein each plural partial information includes representative images of a respective multimedia information.

6. The information describing method according to claim 3, wherein said group of information items including data indicating taste of the user.

7. The information describing method according to claim 5, wherein said group of information items including data indicating personal profile of the user.

8. An information providing apparatus comprising:
    a first database configured to store multimedia information;
    an analyze section configured to analyze said multimedia information stored in said first database using at least one analysis method of moving image analysis, acoustic/speech analysis, and text analysis;
    a second database configured to divide the multimedia information into plural partial information formed of a frame or frames, based on a result of the analysis by the analyze section and to add program feature data representing respective contents of the plural partial information which is obtained from a result of analysis made by the analyze section in units of the partial information or program feature data representing respective contents of the plural partial information which is externally inputted in units of the partial information to the plural partial information to thereby store the plural partial information with the added program feature data; and
    a search engine configured to search for program feature data from said second database in accordance with user profile data to find program feature data which accords with the user profile, and read the partial information from said first database in accordance with the found searched program feature data.

9. The apparatus according to claim 8, wherein each plural partial information includes representative images of a respective multimedia information.

10. The apparatus according to claim 8, wherein said user profile data includes information associated with the user's taste.

11. The apparatus according to claim 8, further comprising a keyboard configured to input said program feature data to said second database.

12. The apparatus according to claim 8, further comprising a third database configured to store said user profile data.

13. The apparatus according to claim 8, further comprising a fourth database configured to store commercial message information and a fifth database configured to store commercial feature data,
wherein said search engine searches for the commercial feature data from said fifth database in accordance with the user profile data, and searches for the commercial message information corresponding to a searched commercial feature data from said fourth database.

14. The apparatus according to claim 8, further comprising a history recording section configured to record a viewing history data of a user.

15. The apparatus according to claim 8, further comprising a display section configured to display the partial information selected by said search engine.

16. The apparatus according to claim 9, further comprising a link section configured to obtain a representative image of said partial information, and construct a display image including said representative image and searched program feature data.

17. The apparatus according to claim 10, wherein the user profile data include information representing one of a producer, title, character, and genre of the multimedia information.

18. The apparatus according to claim 10, wherein said search engine searches for program feature data from said second database, and data which matches a thesaurus of the program feature data.

19. The apparatus according to claim 13, further comprising a display section configured to display the partial information selected by said search engine and display the commercial message information selected by said search engine as a banner.

20. The apparatus according to claim 13, further comprising a display section configured to display the partial information selected by said search engine and display the commercial message information selected by said search engine as a subwindow.

21. The apparatus according to claim 14, wherein said viewing history data represents a user, start and end time of watch, and program feature data of information watched by the user.

22. The apparatus according to claim 14, further comprising:
a third database configured to store said user profile data; and
a rewrite section configured to rewrite the user profile data stored in said third database in accordance with said viewing history data.

23. An information reception apparatus connected to an information providing server having an analyze section configured to analyze multimedia information using at least one analysis method of moving image analysis, acoustic/speech analysis, and text analysis, a database which divides multimedia information into partial information formed of a frame or frames based on a result of analysis by the analyze section, each partial information including representative images of a respective multimedia information, adds either (1) program feature data representing respective contents of the plural partial information which is obtained from a result of analysis made by the analysis section in units of the partial information or (2) program feature data representing respective contents of the plural partial information which is externally input in units of the partial information to the plural partial information to thereby store the partial information with the added program feature data the apparatus comprising:
a search engine configured to search for predetermined program feature data which accords with user profile data from said database and read the partial information from said database in accordance with searched program feature data.

24. The apparatus according to claim 23, wherein each plural partial information includes representative images of a respective multimedia information.

25. The apparatus according to claim 24, further comprising:
a link section configured to obtain a representative image of said partial information, and construct a display image including said representative image and the searched program feature data.

* * * * *